US011904598B2

(12) United States Patent
Clayburn et al.

(10) Patent No.: US 11,904,598 B2
(45) Date of Patent: Feb. 20, 2024

(54) CONDITIONERS INCLUDING CONDITIONER SHUTDOWN

(71) Applicant: Hewlett-Packard Development Company, L.P., Spring, TX (US)

(72) Inventors: Jody L Clayburn, Vancouver, WA (US); Ian Anderson, Vancouver, WA (US); Brooke Hoyer, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 730 days.

(21) Appl. No.: 17/048,027

(22) PCT Filed: Jul. 25, 2018

(86) PCT No.: PCT/US2018/043702

§ 371 (c)(1),
(2) Date: Oct. 15, 2020

(87) PCT Pub. No.: WO2020/023031

PCT Pub. Date: Jan. 30, 2020

(65) Prior Publication Data

US 2021/0170742 A1 Jun. 10, 2021

(51) Int. Cl.
*B41F 23/04* (2006.01)
*B41J 29/377* (2006.01)
(Continued)

(52) U.S. Cl.
CPC ....... *B41F 23/0443* (2013.01); *B41J 11/0005* (2013.01); *B41J 11/0024* (2021.01);
(Continued)

(58) Field of Classification Search
CPC ............... B41F 23/0443; B41J 11/0024; B41J 11/0005; B41J 29/377; B41M 7/009; G03G 15/2017
(Continued)

(56) References Cited

U.S. PATENT DOCUMENTS 5,550,621 A * 8/1996 Ogawahara ........ G03G 15/2042 399/92
5,787,321 A 7/1998 Nishikawa
(Continued)

FOREIGN PATENT DOCUMENTS

WO WO-2006084807 A1 * 8/2006 ........... B65B 31/043
WO WO 2020-032031 A1 * 1/2020 .......... B41F 23/0443
WO WO-2020023031 A1 * 1/2020 .......... B41F 23/0443

*Primary Examiner* — Stephen M Gravini
(74) *Attorney, Agent, or Firm* — Brooks, Cameron & Huebsch, PLLC

(57) ABSTRACT

A conditioner includes a pressure roller assembly, a tension roller assembly, a heating element, a pressure roller drive motor, a tension drive motor, and a controller. The heating element heats the pressure roller assembly. The pressure roller drive motor rotates the pressure roller assembly. The tension drive motor rotates the tension roller assembly. The controller receives a print job complete notification to initiate a conditioner shutdown. In response to the print job complete notification, the controller turns off the tension drive motor. The controller sets the heating element to a predetermined temperature and waits a first predetermined period. In response to the first predetermined period elapsing, the controller turns off the heating element. With the heating element turned off, the controller turns off the pressure roller drive motor.

15 Claims, 6 Drawing Sheets

(51) Int. Cl.
*B41J 11/00* (2006.01)
*B41M 7/00* (2006.01)
*G03G 15/20* (2006.01)

(52) U.S. Cl.
CPC ............ *B41J 29/377* (2013.01); *B41M 7/009* (2013.01); *G03G 15/2017* (2013.01)

(58) Field of Classification Search
USPC ............................................................. 34/254
See application file for complete search history.

(56) References Cited

U.S. PATENT DOCUMENTS

| | | | | |
|---|---|---|---|---|
| 6,385,410 | B1 * | 5/2002 | Hanyu | G03G 15/2064 399/68 |
| 6,552,304 | B1 | 4/2003 | Hirose et al. | |
| 7,031,624 | B2 | 4/2006 | Kobayashi et al. | |
| 7,177,559 | B2 | 2/2007 | Inoue et al. | |
| 7,324,771 | B2 | 1/2008 | Lemaster et al. | |
| 7,506,491 | B2 * | 3/2009 | Rimondi | B65B 31/043 53/89 |
| 7,860,419 | B2 | 12/2010 | Tateishi et al. | |
| 8,305,411 | B1 | 11/2012 | Yamamoto | |
| 8,862,010 | B2 | 10/2014 | Ando | |
| 8,953,959 | B2 | 2/2015 | Saeki | |
| 9,134,667 | B2 * | 9/2015 | Ono | G03G 15/2017 |
| 9,494,897 | B2 * | 11/2016 | Kikushima | G03G 15/2053 |
| 10,073,389 | B1 * | 9/2018 | Ajima | G03G 15/205 |
| 10,310,422 | B2 * | 6/2019 | Izawa | G03G 15/2039 |
| 10,983,461 | B2 * | 4/2021 | Kurata | G03G 15/2039 |
| 2001/0048822 | A1 * | 12/2001 | Hanyu | G03G 15/2039 399/92 |
| 2004/0190925 | A1 * | 9/2004 | Baruch | G03G 15/2042 399/328 |
| 2007/0189796 | A1 | 8/2007 | Chae et al. | |
| 2007/0216719 | A1 | 9/2007 | Ito | |
| 2014/0023389 | A1 | 1/2014 | Ono | |
| 2021/0170742 | A1 * | 6/2021 | Clayburn | B41M 7/009 |

* cited by examiner

CONDITIONERS INCLUDING CONDITIONER SHUTDOWN

BACKGROUND

Inkjet printers can deposit quantities of printing fluid onto a printable media (e.g., paper, plastic, etc.). In some examples, inkjet printers can create a curl and/or cockle in the printed media when the printing fluid droplets deposited by the inkjet printer are not completely dry. In some examples, a number of physical properties of the printable media can be changed when the printing fluid droplets deposited by the inkjet printer are not completely dry. For example, the stiffness of the printable media can be changed when the printing fluid droplets deposited by the inkjet printer are not completely dry. The curl, cockle, and/or other physical properties that change due to the printing fluid droplets can make finishing processes difficult.

DETAILED DESCRIPTION

Figure 1:
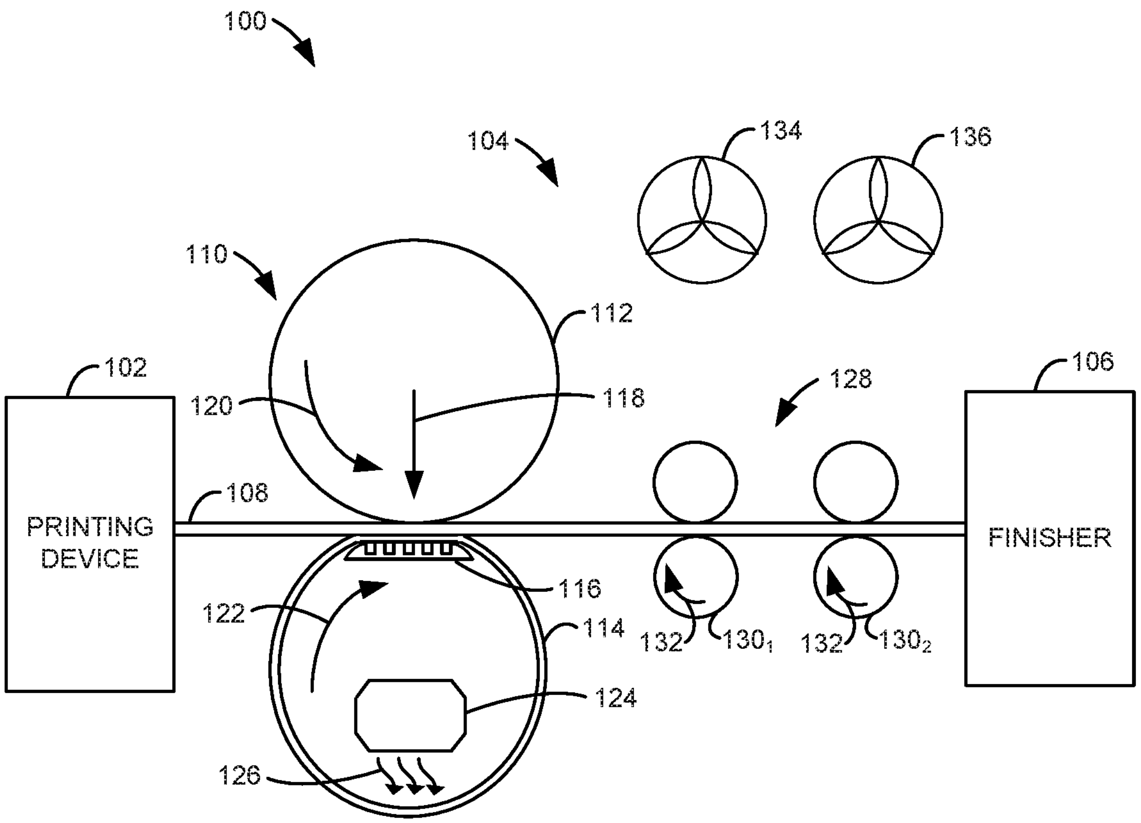
FIG. 1 is a schematic diagram illustrating one example of a printer including a conditioner.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

A number of systems and devices for a partially dried inkjet media conditioner are described herein. In some examples, a partially dried inkjet media conditioner includes a heated pressure roller assembly to apply pressure to a first side of partially dried inkjet media and apply heat to a second side of the partially dried inkjet media. As used herein, partially dried inkjet media may include media with applied printing fluid from an inkjet type printing device that is not completely dried on the media. The conditioner may be utilized to increase evaporation of printing fluid applied to the partially dried inkjet media and remove or reduce distorted properties from the partially dried inkjet media.

The partially dried inkjet media may provide difficulties when stacking, aligning, and/or finishing. For example, the partially dried inkjet media may have distorted properties such as a curl, a cockle, a reduction in stiffness, increased surface roughness, extruding fibers from the surface, misaligned fibers, and/or increased sheet to sheet friction of the media. In some examples, these distorted properties may be caused by printing fluid deposited on the media and the media absorbing the printing fluid. For example, the printing fluid may be in a liquid state that may be absorbed by a media such as paper. In this example, the liquid state of the printing fluid may cause the distorted properties of the media in a similar way that other liquids may distort the properties of the media.

In some examples, the conditioner may be utilized to increase evaporation of printing fluid applied to the partially dried inkjet media. In some examples, the conditioner can remove or reduce the distorted properties generated by the printing fluid applied to the partially dried inkjet media. For example, the partially dried inkjet media may include extruding fibers from the surface that can be embedded into the surface of the partially dried inkjet media by the pressure and heat applied by the conditioner.

The conditioner may utilize high power heaters to assist with ink vehicle evaporation and conditioning of the partially dried inkjet media. This heating and conditioning may be used to make the media output from the conditioner compatible with a finishing device, such as a stapler, hole punch, collator, stacker, etc. The conditioner should be safely shut down when not in use to maximize the life of the conditioner.

Accordingly, described herein are example conditioners including a heated pressure roller assembly that may be arranged between a printing device and a finisher in an inkjet printer. The conditioner is shut down in response to a print job complete notification to minimize cycles on the heated pressure roller assembly, thereby increasing the life of the heated pressure roller assembly. Each component of the conditioner may be turned off in a specified order and based on a specified timing to allow the components to cool down. If another print job is initiated, the shutdown of the conditioner may be aborted. The conditioner may be shut down immediately in response to a fault (e.g., door open, paper jam, etc.) to prevent injury to a user or damage to the printer.

FIG. 1 is a schematic diagram illustrating one example of a printer 100. Printer 100 may include a printing device 102, a conditioner 104, and a finisher 106. Conditioner 104 may include a print media path 108, a pressure roller assembly 110, a heating element 124, a tension roller assembly 128, a vapor fan 134, and a cooling fan 136. Pressure roller assembly 110 may include a pressure roller 112, a belt 114, and a platen 116. Partially dried inkjet media may exit printing device 102 and enter pressure roller assembly 110 via print media path 108.

Pressure may be applied to the top surface of the print media by pressure roller 112 as indicated by arrow 118. The pressure may be released when pressure roller 112 is not being used. The bottom surface of the print media contacts belt 114 over platen 116. Pressure roller 112 rotates in the direction indicated by arrow 120 and belt 114 rotates in the direction indicated by arrow 122 to draw print media between pressure roller 112 and belt 114. Heating element 124 may apply heat to pressure roller assembly 110 as indicated at 126. In one example as shown in FIG. 1, heating element 124 may apply heat to belt 114, and belt 114 may apply the heat to the print media.

Tension roller assembly 128 may include a first pair of rollers $\mathbf{130_1}$ and a second pair of roller $\mathbf{130_2}$. The upper roller of each pair $\mathbf{130_1}$ and $\mathbf{130_2}$ contacts the top surface of the print media and the lower roller of each pair contacts the bottom surface of the print media. The rollers $\mathbf{130_1}$ and $\mathbf{130_2}$ rotate in the direction indicated by arrows 132 to draw print media between the upper and lower rollers and to apply tension to the print media at the output of pressure roller assembly 110.

Vapor fan 134 may exhaust vapor from conditioner 104. The vapor may include evaporated printing fluid due to the drying of the inkjet print media within conditioner 104. Cooling fan 136 may circulate air within conditioner 104 to prevent overheating of the components of conditioner 104. While one vapor fan 134 and one cooling fan 136 is illustrated in FIG. 1, in other examples conditioner 104 may include a plurality of vapor fans and a plurality of cooling fans. The conditioned print media is passed to finisher 106 via print media path 108. Finisher 106 may include a stapler, a hole punch, a collator, a stacker, etc., or any combination thereof.

Figure 2A:
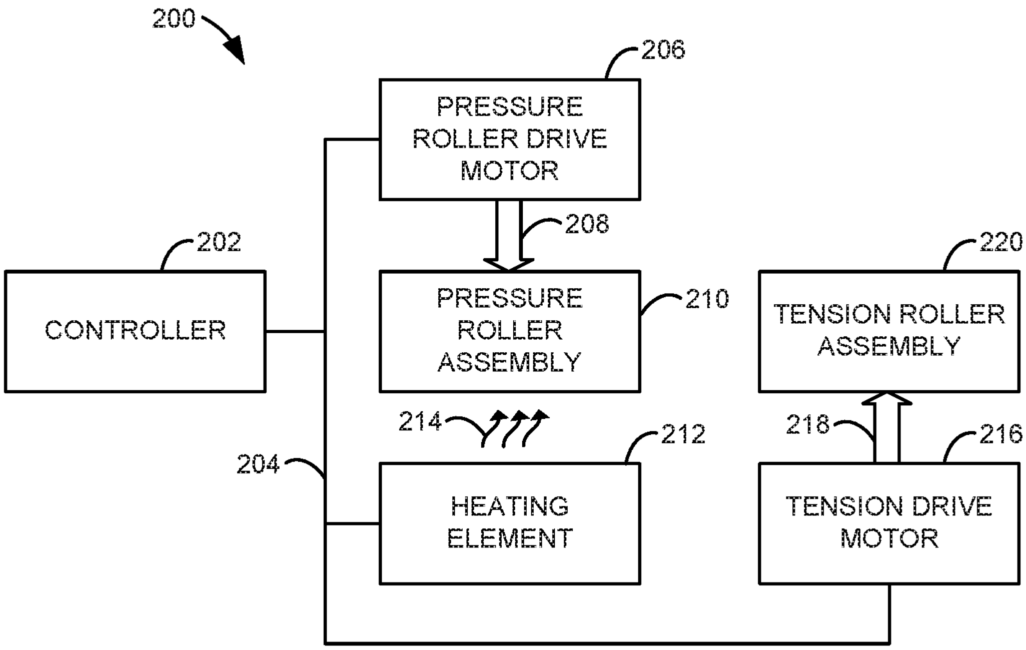
FIG. 2A is a block diagram illustrating one example of a conditioner.

FIG. 2A is a block diagram illustrating one example of a conditioner 200. Conditioner 200 includes a controller 202, a pressure roller drive motor 206, a pressure roller assembly 210, a heating element 212, a tension drive motor 216, and a tension roller assembly 220. Controller 202 is electrically coupled to pressure roller drive motor 206, heating element 212, and tension drive motor 216 through a communication path 204. Pressure roller drive motor 206 is mechanically coupled to pressure roller assembly 210 as indicated at 208 to rotate the pressure roller assembly. Pressure roller assembly 210 may include a pressure roller 112 and a belt 114 as previously described and illustrated with reference to FIG. 1. In one example, pressure roller drive motor 206 rotates pressure roller 112 and/or belt 114.

Heating element 212 heats pressure roller assembly 210 as indicated at 214. In one example, heating element 212 includes bulbs, such as halogen bulbs. Heating element 212 may be similar to heating element 124 and may heat belt 114 as previously described and illustrated with reference to FIG. 1. Tension drive motor 216 is mechanically coupled to tension roller assembly 220 as indicated at 218 to rotate the tension roller assembly. Tension roller assembly 220 may include rollers $\mathbf{130}_1$ and $\mathbf{130}_2$ as previously described and illustrated with reference to FIG. 1. In one example, tension roller drive motor 216 rotates rollers $\mathbf{130}_1$ and $\mathbf{130}_2$.

Controller 202 may receive a print job complete notification to initiate a conditioner shutdown. In response to the print job complete notification, controller 202 may turn off tension drive motor 216. Controller 202 may then set heating element 212 to a predetermined temperature and wait a first predetermined period. In one example, the predetermined temperature may be between about 1° C. and 10° C. (e.g., 1° C.) and the first predetermined period may be between about 25 seconds and 30 seconds (e.g., 28 seconds). In response to the first predetermined period elapsing, controller 202 may turn off heating element 212. With heating element 212 turned off, controller 202 may turn off pressure roller drive motor 206.

With tension drive motor 216 turned off and prior to setting heating element 212 to the predetermined temperature, controller 202 may further set pressure roller drive motor 206 to a predetermined speed. In one example, the predetermined speed may be between about 1 inch per second and 5 inches per second (e.g., 1 inch per second). Controller 202 may further set a pressure of pressure roller assembly 210 to a released state. With the pressure of pressure roller assembly 210 in the released state, controller 202 may then set heating element 212 to the predetermined temperature. Controller 202 may further abort shutdown of conditioner 200 in response to receiving a new print job notification. In response to receiving a new print job notification, controller 202 may turn on pressure roller drive motor 206, heating element 212, and tension drive motor 216 if they were turned off prior to receiving the new print job notification.

Figure 2B:
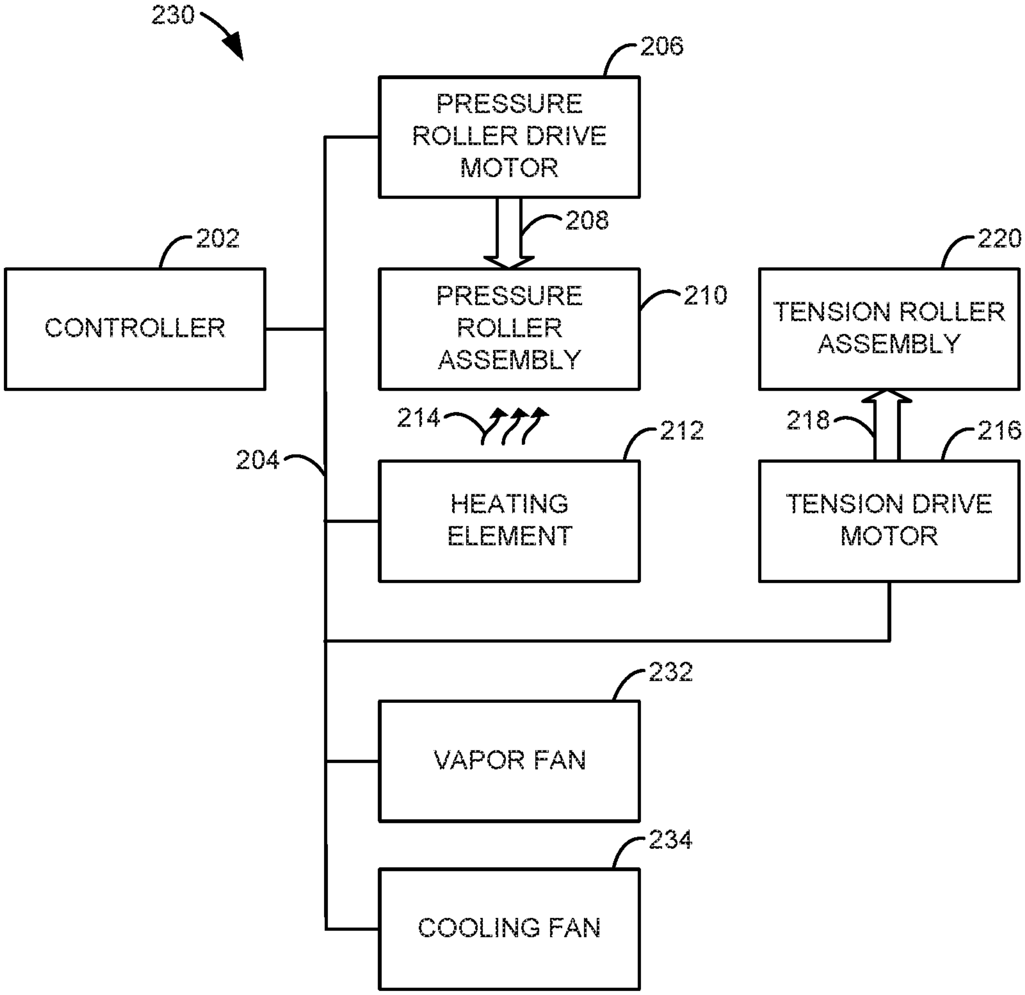
FIG. 2B is a block diagram illustrating another example of a conditioner.

FIG. 2B is a block diagram illustrating another example of a conditioner 230. Conditioner 230 includes controller 202, pressure roller drive motor 206, pressure roller assembly 210, heating element 212, tension drive motor 216, and tension roller assembly 220 as previously described and illustrated with reference to FIG. 2A. In addition, conditioner 230 includes a vapor fan 232 and a cooling fan 234. Controller 202 is electrically coupled to vapor fan 232 and cooling fan 234 through the communication path 204.

In this example, in response to the print job complete notification and with pressure roller drive motor 206 turned off, controller 202 may further turn off vapor fan 232 and wait a second predetermined period. In one example, the second predetermined period is between about 1 second and 10 seconds (e.g., 5 seconds). In response to the second predetermined period elapsing, controller 202 may further turn off cooling fan 234.

Controller 202 may receive an immediate shutdown notification. An immediate shutdown notification may be received in response to a fault (e.g., paper jam, door opened, etc.). In response to the immediate shutdown notification, controller 202 may turn off tension drive motor 216. With tension drive motor 216 turned off, controller 202 may turn off heating element 212. With heating element 212 turned off, controller 202 may turn off pressure roller drive motor 206. With pressure roller drive motor 206 turned off, controller 202 may turn off vapor fan 232. With vapor fan 232 turned off, controller 202 may turn off cooling fan 234.

Figure 3:
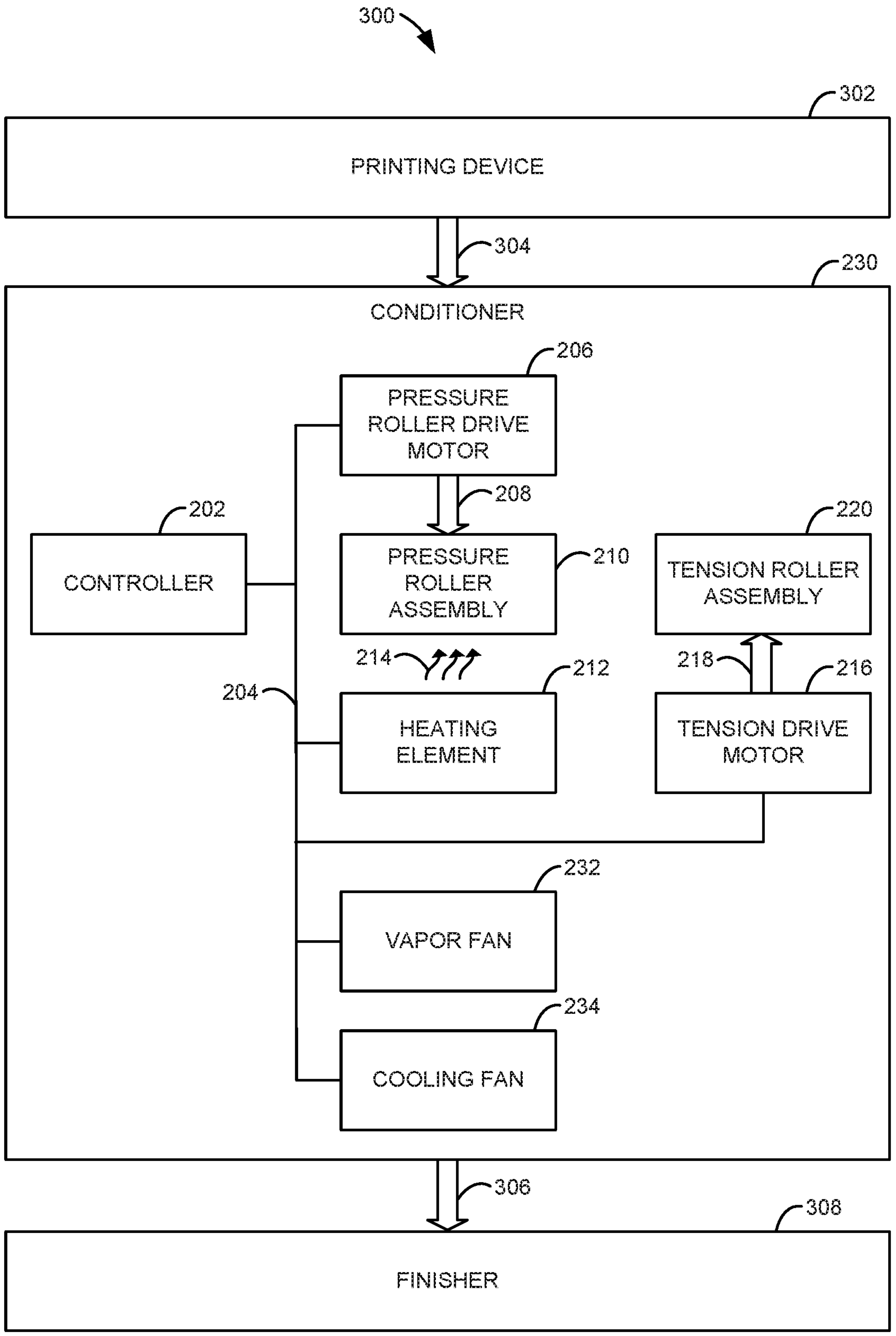
FIG. 3 is a block diagram illustrating one example of a system including a conditioner.

FIG. 3 is a block diagram illustrating one example of a system 300. System 300 includes a printing device 302, a conditioner 230, and a finisher 308. Printing device 302 is coupled to conditioner 230 via a print media path 304. Conditioner 230 is coupled to finisher 308 via a print media path 306. Printing device 302 may be an inkjet printing device or another suitable printing device that generates partially dried media. The partially dried media is passed to conditioner 230. Conditioner 230 was previously described with reference to FIG. 2B. Conditioner 230 applies heat and pressure to the partially dried media. Conditioner 230 passes the conditioned print media to finisher 308. Finisher 308 may include a stapler, hole punch, collator, stacker, etc., or any combination thereof.

Controller 202 may receive a print job complete notification to initiate a conditioner shutdown. In response to the print job complete notification, controller 202 may turn off tension drive motor 216. With tension drive motor 216 turned off, controller 202 may set the pressure roller drive motor to a predetermined speed. Controller 202 may set a pressure of pressure roller assembly 210 to a released state. With the pressure of pressure roller assembly 210 in the released state, controller 202 may set heating element 212 to a predetermined temperature and wait a first predetermined period. In response to the first predetermined period elapsing, controller 202 may turn off heating element 212. With heating element 212 turned off, controller 202 may turn off pressure roller drive motor 206. With pressure roller drive motor 206 turned off, controller 202 may turn off vapor fan 232 and wait a second predetermined period. In response to the second predetermined period elapsing, controller 202 may turn off cooling fan 234.

Controller 202 may receive an immediate shutdown notification. In response to the immediate shutdown notification, controller 202 may turn off tension drive motor 216. With tension drive motor 216 turned off, controller 202 may set a pressure of pressure roller assembly 210 to a released state. With the pressure of pressure roller assembly 210 in the released state, controller 202 may turn off heating element 212. With heating element 212 turned off, controller 202 may turn off pressure roller drive motor 206. With pressure roller drive motor 206 turned off, controller 202 may turn off vapor fan 232. With vapor fan 232 turned off, controller 202 may turn off cooling fan 234.

Figure 4A:
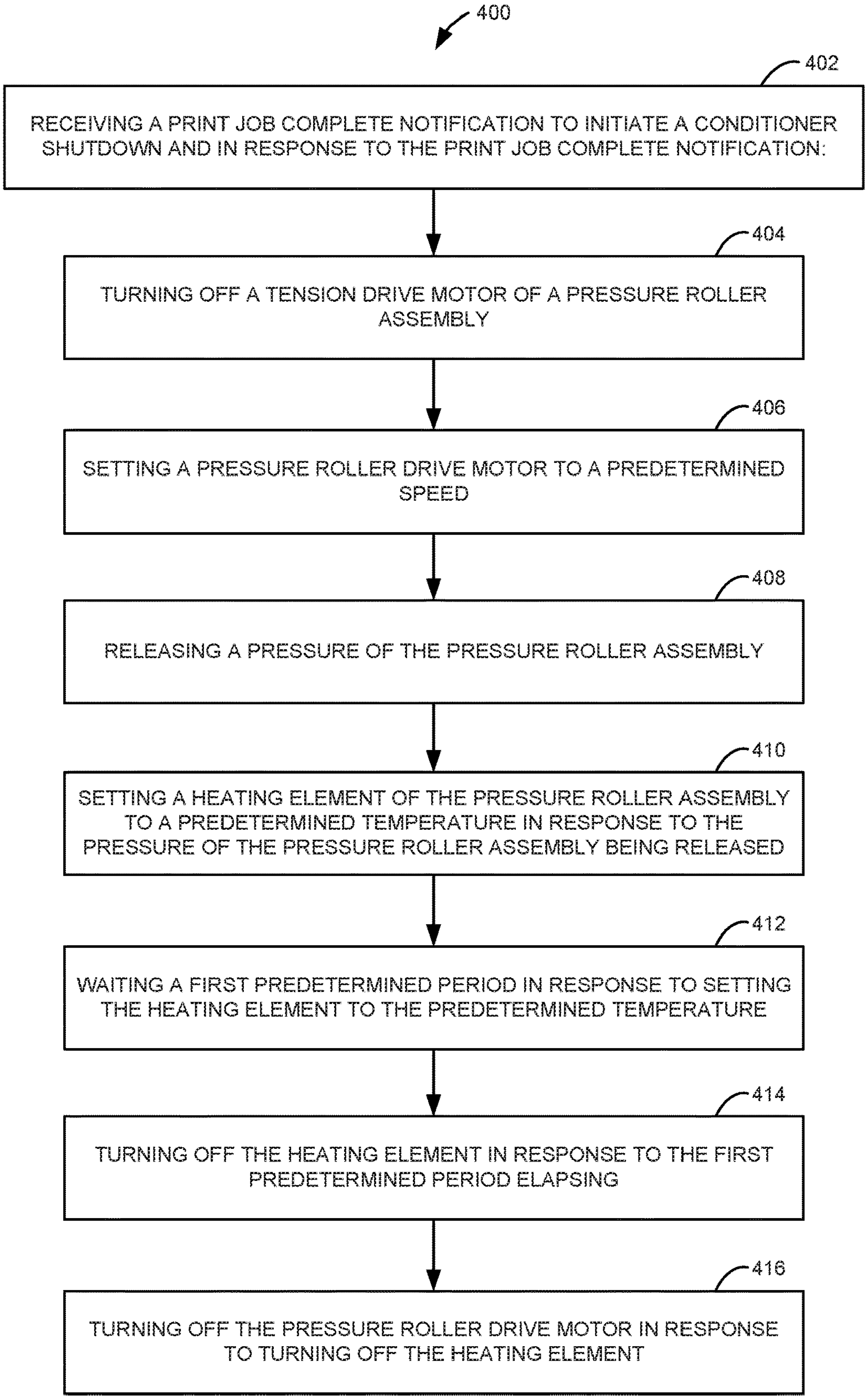
FIGS. 4A-4E are flow diagrams illustrating one example of a method for operating a printer.

FIGS. 4A-4E are flow diagrams illustrating one example of a method 400 for operating a printer. As illustrated in FIG. 4A, at 402 method 400 includes receiving a print job complete notification to initiate a conditioner shutdown. In response to the print job complete notification, method 400 includes blocks 404-416. At 404, method 400 includes turning off a tension drive motor of a pressure roller assembly. At 406, method 400 includes setting a pressure roller drive motor to a predetermined speed. At 408, method 400 includes releasing a pressure of the pressure roller assembly. At 410, method 400 includes setting a heating element of the pressure roller assembly to a predetermined temperature in response to the pressure of the pressure roller assembly being released. At 412, method 400 includes waiting a first predetermined period in response to setting the heating element to the predetermined temperature. At 414, method 400 includes turning off the heating element in response to the first predetermined period elapsing. At 416, method 400 includes turning off the pressure roller drive motor in response to turning off the heating element.

Figure 4B:
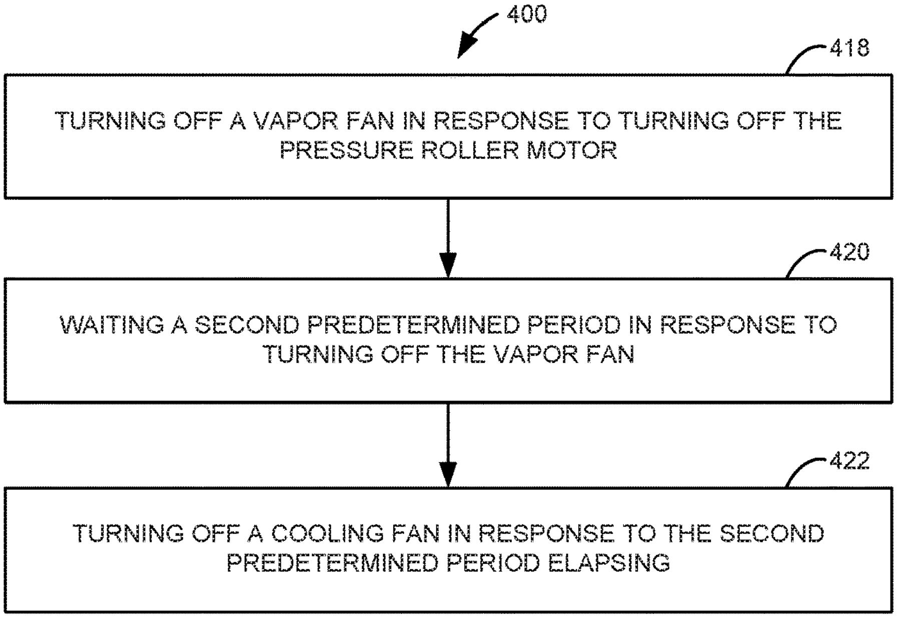

As illustrated in FIG. 4B, method 400 may also include blocks 418-422 in response to the print job complete notification. At 418, method 400 may further include turning off a vapor fan in response to turning off the pressure roller drive motor. At 420, method 400 may further include waiting a second predetermined period in response to turning off the vapor fan. At 422, method 400 may further include turning off a cooling fan in response to the second predetermined period elapsing.

Figure 4C:
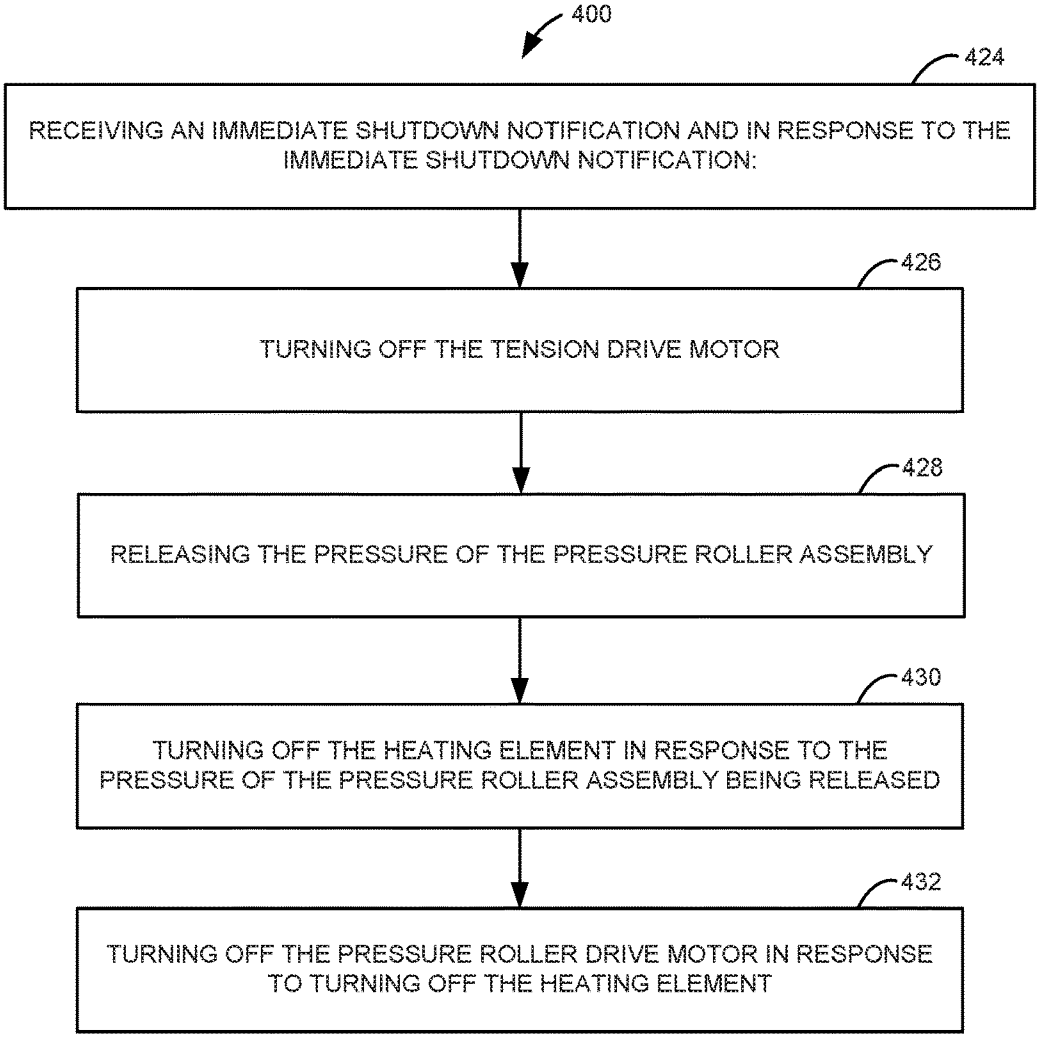

As illustrated in FIG. 4C, at 424 method 400 may include receiving an immediate shutdown notification. In response to the immediate shutdown notification, method 400 may execute blocks 426-432. At 426, method 400 may further include turning off the tension drive motor. At 428, method 400 may further include releasing the pressure of the pressure roller assembly. At 430, method 400 may further include turning off the heating element in response to the pressure of the pressure roller assembly being released. At 432, method 400 may further include turning off the pressure roller drive motor in response to turning off the heating element.

Figure 4D:
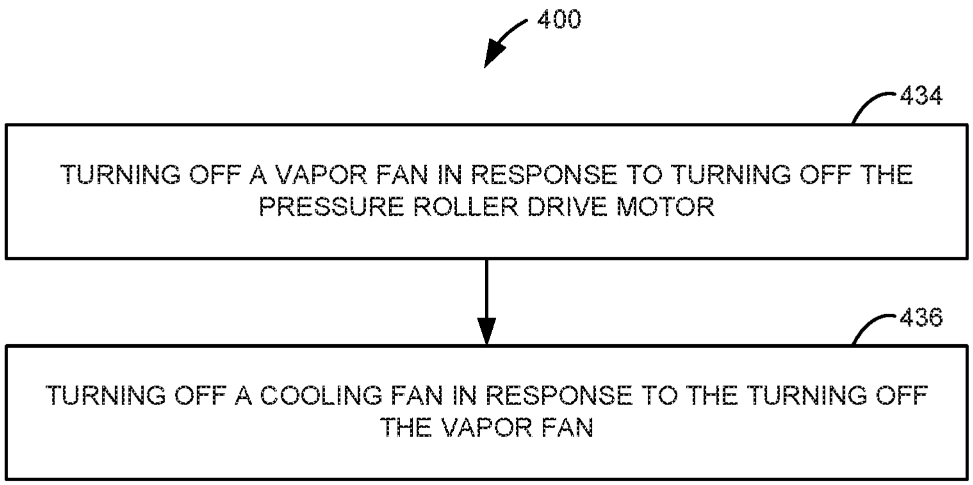
Figure 4E:
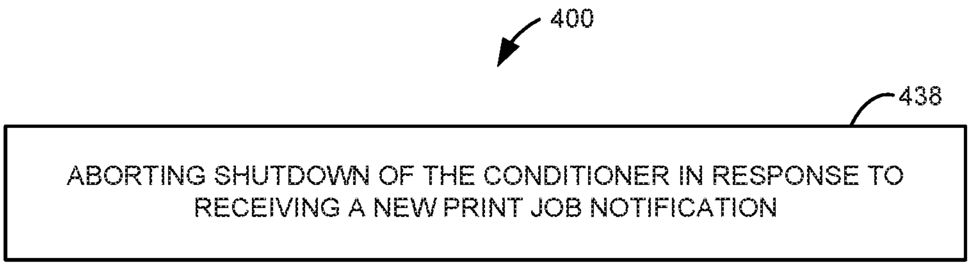

As illustrated in FIG. 4D, method 400 may also include blocks 434 and 436 in response to the immediate shutdown notification. At 434, method 400 may further include turning off a vapor fan in response to turning off the pressure roller drive motor. At 436, method 400 may further include turning off a cooling fan in response to the turning off the vapor fan. As illustrated in FIG. 4E, at 438 method 400 may further include aborting shutdown of the conditioner in response to receiving a new print job notification.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A conditioner comprising:
- a pressure roller assembly;
- a tension roller assembly;
- a heating element to heat the pressure roller assembly;
- a pressure roller drive motor to rotate the pressure roller assembly;
- a tension drive motor to rotate the tension roller assembly; and
- a controller to receive a print job complete notification to initiate a conditioner shutdown and in response to the print job complete notification:
  - turn off the tension drive motor;
  - in response to turning off the tension drive motor, set the heating element to a predetermined temperature and wait a first predetermined period;
  - in response to the first predetermined period elapsing, turn off the heating element; and
  - in response to turning the heating element off, turn off the pressure roller drive motor.

2. The conditioner of claim 1, further comprising:
- a vapor fan; and
- a cooling fan,
- wherein the controller is to further in response to the print job complete notification:
  - with the pressure roller drive motor turned off, turn off the vapor fan and wait a second predetermined period; and
  - in response to the second predetermined period elapsing, turn off the cooling fan.

3. The conditioner of claim 2, wherein the controller is to receive an immediate shutdown notification and in response to the immediate shutdown notification:
- turn off the tension drive motor;
- with the tension drive motor turned off, turn off the heating element;
- with the heating element turned off, turn off the pressure roller drive motor;
- with the pressure roller drive motor turned off, turn off the vapor fan; and
- with the vapor fan turned off, turn off the cooling fan.

4. The conditioner of claim 1, wherein the controller is to further in response to the print job complete notification:
- with the tension drive motor turned off, set the pressure roller drive motor to a predetermined speed;
- set a pressure of the pressure roller assembly to a released state; and
- with the pressure of the pressure roller assembly in the released state, set the heating element to the predetermined temperature.

5. The conditioner of claim 1, wherein the controller aborts shutdown of the conditioner in response to receiving a new print job notification.

6. The conditioner of claim 1, wherein the heating element comprises bulbs.

7. The conditioner of claim 1, wherein the pressure roller assembly comprises a pressure roller and a belt opposite to the pressure roller and print media is drawn between the pressure roller and the belt.

8. A system comprising:
- a printing device to generate partially dried media;
- a conditioner to apply heat and pressure to the partially dried media; and
- a finisher to receive the partially dried media from the conditioner,
- wherein the conditioner comprises:
  - a pressure roller assembly;
  - a tension roller assembly;
  - a heating element to heat the pressure roller assembly;

a pressure roller drive motor to rotate the pressure roller assembly;

a tension drive motor to rotate the tension roller assembly;

a vapor fan;

a cooling fan; and a controller to receive a print job complete notification to initiate a conditioner shutdown and in response to the print job complete notification:

turn off the tension drive motor;

in response to turning off the tension drive motor, set the pressure roller drive motor to a predetermined speed;

in response to setting the pressure roller drive motor to a predetermined speed, set a pressure of the pressure roller assembly to a released state;

with the pressure of the pressure roller assembly in the released state, set the heating element to a predetermined temperature and wait a first predetermined period;

in response to the first predetermined period elapsing, turn off the heating element;

in response to turning the heating element off, turn off the pressure roller drive motor;

with the pressure roller drive motor turned off, turn off the vapor fan and wait a second predetermined period; and in response to the second predetermined period elapsing, turn off the cooling fan.

9. The system of claim 8, wherein the controller is to receive an immediate shutdown notification and in response to the immediate shutdown notification:

turn off the tension drive motor;

with the tension drive motor turned off, set a pressure of the pressure roller assembly to a released state;

with the pressure of the pressure roller assembly in the released state, turn off the heating element;

with the heating element turned off, turn off the pressure roller drive motor;

with the pressure roller drive motor turned off, turn off the vapor fan; and with the vapor fan turned off, turn off the cooling fan.

10. The system of claim 8, wherein the printing device comprises an inkjet printing device.

11. A method for operating a printer, the method comprising receiving a print job complete notification to initiate a conditioner shutdown and in response to the print job complete notification:

turning off a tension drive motor of a pressure roller assembly;

in response to turning off the tension drive motor, setting a pressure roller drive motor to a predetermined speed;

in response to setting the pressure roller drive motor to a predetermined speed, releasing a pressure of the pressure roller assembly;

setting a heating element of the pressure roller assembly to a predetermined temperature in response to the pressure of the pressure roller assembly being released;

waiting a first predetermined period in response to setting the heating element to the predetermined temperature;

turning off the heating element in response to the first predetermined period elapsing; and turning off the pressure roller drive motor in response to turning off the heating element.

12. The method of claim 11, further comprising in response to the print job complete notification:

turning off a vapor fan in response to turning off the pressure roller drive motor;

waiting a second predetermined period in response to turning off the vapor fan; and turning off a cooling fan in response to the second predetermined period elapsing.

13. The method of claim 11, further comprising:

receiving an immediate shutdown notification and in response to the immediate shutdown notification:

turning off the tension drive motor;

releasing the pressure of the pressure roller assembly;

turning off the heating element in response to the pressure of the pressure roller assembly being released; and turning off the pressure roller drive motor in response to turning off the heating element.

14. The method of claim 13, further comprising in response to the immediate shutdown notification:

turning off a vapor fan in response to turning off the pressure roller drive motor; and turning off a cooling fan in response to the turning off the vapor fan.

15. The method of claim 11, further comprising:

aborting shutdown of the conditioner in response to receiving a new print job notification.

* * * * *